United States Patent
Masuda et al.

(10) Patent No.: US 8,693,128 B2
(45) Date of Patent: *Apr. 8, 2014

(54) APPARATUS AND METHOD FOR WRITING DATA TO TAPE MEDIUM

(75) Inventors: Setsuko Masuda, Yokohama (JP); Kenji Nakamura, Sagamihara (JP); Yutaka Oishi, Kawasaki (JP)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/527,683

(22) Filed: Jun. 20, 2012

(65) Prior Publication Data

US 2012/0257301 A1 Oct. 11, 2012

Related U.S. Application Data

(63) Continuation of application No. 13/056,966, filed as application No. PCT/JP2009/062784 on Jul. 15, 2009.

(30) Foreign Application Priority Data

Aug. 5, 2008 (JP) .................................. 2008-201942

(51) Int. Cl.
- *G11B 15/04* (2006.01)
- *G11B 5/09* (2006.01)
- *G11B 5/584* (2006.01)
- *G11B 21/02* (2006.01)

(52) U.S. Cl.
USPC ............... 360/60; 360/53; 360/75; 360/77.12

(58) Field of Classification Search
None
See application file for complete search history.

(56) References Cited

U.S. PATENT DOCUMENTS

| 5,138,499 A | 8/1992 | Tamegai |
| 5,502,603 A | 3/1996 | Kohno et al. |
| 6,349,010 B1 | 2/2002 | Binder-Krieglstein |
| 8,081,396 B2 | 12/2011 | Katagiri et al. |

FOREIGN PATENT DOCUMENTS

| GB | 1478340 A | 6/1977 |
| JP | 03-046102 | 2/1991 |
| JP | 2001-067601 | 3/2001 |
| JP | 2002500803 | 1/2002 |
| WO | 99/52099 | 10/1999 |

*Primary Examiner* — K. Wong
(74) *Attorney, Agent, or Firm* — Griffiths & Seaton PLLC

(57) ABSTRACT

In a controller of a tape drive, a command processing unit receives a request to write new data, an offset determination unit determines whether old data is not partially overwritten with new data, and if old data is not partially overwritten with new data, a head position management unit makes a write head offset toward the unoverwritten portion. Then, a channel input/output unit reads pattern data that disables old data from a pattern storage unit and outputs the data to the write head to thereby overwrite the old data with the pattern data. After that, a tape transport management unit rewinds a tape and the head position management unit returns the write head to the original position to overwrite the old data with the new data as usual.

5 Claims, 8 Drawing Sheets

| FORMAT | LTO1 | LTO2 | LTO3 | LTO4 |
|---|---|---|---|---|
| TRACK PITCH | 27.5 μm | 20.2 μm | 14.3 μm | 11.5 μm |

(b)

| TAPE DRIVE | LTO3 | LTO4 |
|---|---|---|
| WRITE HEAD | 19.5 μm | 13.8 μm |
| READ HEAD | 6.5 μm | 5.3 μm |

(a)

(b)

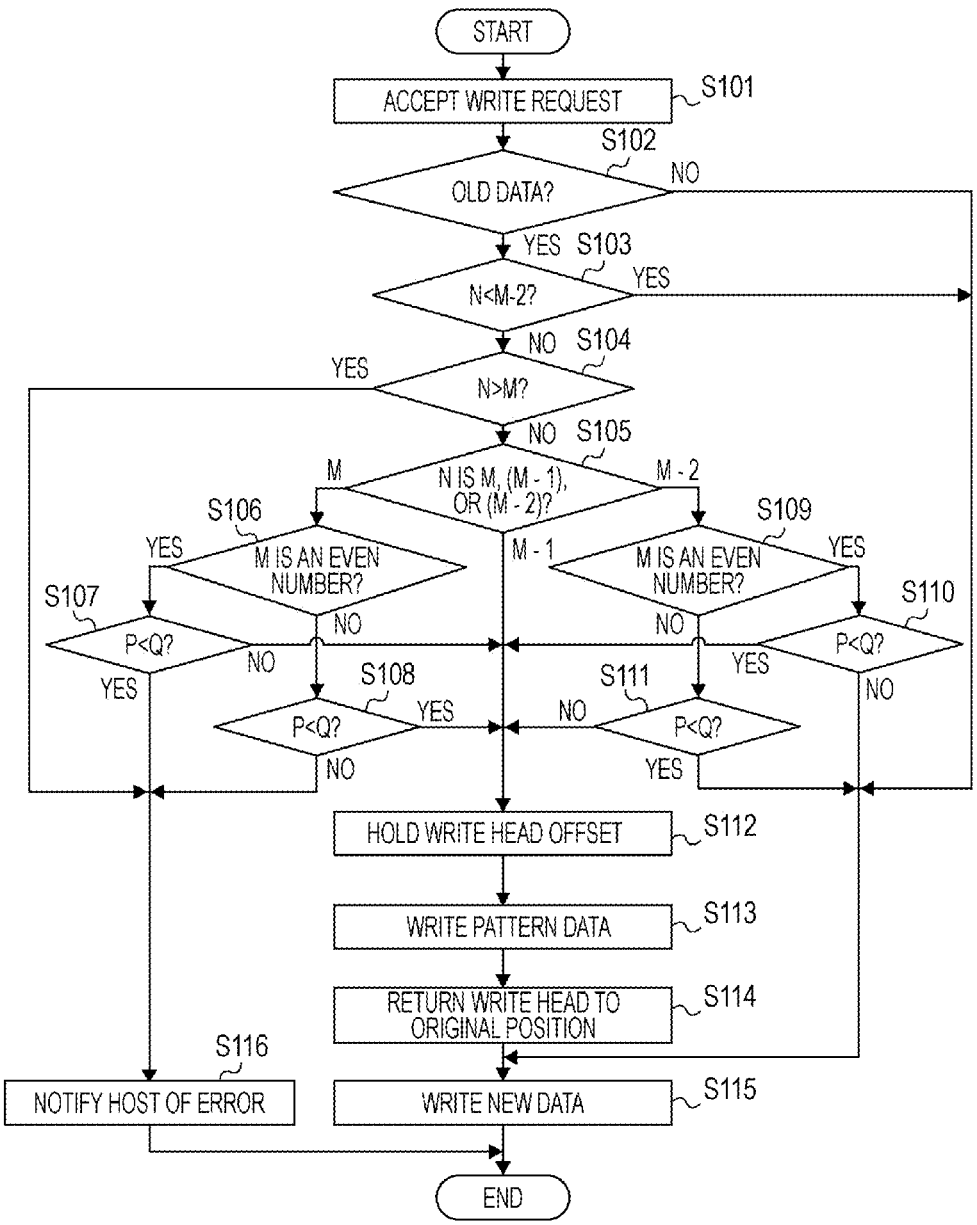

APPARATUS AND METHOD FOR WRITING DATA TO TAPE MEDIUM

CROSS-REFERENCE TO RELATED APPLICATIONS

This application is a Continuation Application of a U.S. National-Stage entry under 35 U.S.C §371, U.S. Ser. No. 13/056,966, filed Jan. 31, 2011, which was based on International Application No. PCT/JP2009/062784 filed Jul. 15, 2009, which was published under PCT Article 21(2) and which claims priority to Japanese Patent Application No. 2008-201942 filed Aug. 5, 2008.

BACKGROUND OF THE INVENTION

Field of the Invention

The present invention relates to an apparatus and method for writing data to a tape medium. In particular, the invention relates to an apparatus and method for writing data to a tape medium using a write head.

Description of the Related Art

Tape media such as a magnetic tape can record a large amount of data with a relatively low cost. On the other hand, the tape media have been often used for long-term storage of data written to a hard disk or the like because of lower read/write speeds than that of the hard disk or the like.

In recent years, such a tape medium has been improved of recording density. As a result, a larger amount of data can be recorded to the tape medium.

To improve the recording density, data recorded to the tape medium might be overwritten with new data (see Japanese Unexamined Patent Application Publication No. 2001-67601, for example). The technique disclosed in Japanese Unexamined Patent Application Publication No. 2001-67601 references a table showing correlations between model names of tapes and recording densities to determine whether data can be overwritten to realize preset recording density and determine a recording frequency, tape transport speed, and write current that enable an overwriting operation, and if determining that data can be overwritten, sets appropriate recording frequency, tape transport speed, and write current to perform the overwriting operation.

SUMMARY OF THE INVENTION

Such a technique of overwriting data recorded to a tape medium with new data to improve a recording density of the tape medium has been developed hitherto.

However, Japanese Unexamined Patent Application Publication No. 2001-67601 gives no description about an operation for writing new data with a certain width to overwrite old data written with a width larger than the certain width with the new data to thereby improve a recording density of the tape medium. Accordingly, the technique disclosed in Japanese Unexamined Patent Application Publication No. 2001-67601 cannot prevent occurrences of such a defect that old data is not completely overwritten with new data upon such an overwriting operation, and the new data cannot be properly read.

It is an object of the present invention to prevent such a defect that old data is not completely overwritten with new data and the new data cannot be properly read.

To attain the above object, the present invention provides an apparatus for writing data to a tape medium using a write head, including an acquiring unit for acquiring data to be written, a positioning unit for adjusting a position of the write head to a designated position on the tape medium, and a write unit for sending the data acquired with the acquiring unit to the write head to write the data to the designated position, wherein before the write unit writes first data acquired with the acquiring unit to a first position with a first width, if a portion of second data written with a second width larger than the first width is already written to the first position, the positioning unit adjusts a position of the write head to a second position where the other portion of the second data is left, not overwritten with the first data, and the write unit sends third data that disables the second data toward the write head to write the third data to the second position.

Preferably, the apparatus according to the present invention further includes a determination unit for determining whether the portion of the second data is already written to the first position, wherein if the determination unit determines that the portion of the second data is already written to the first position, the positioning unit adjusts a position of the write head to the second position, and the write unit writes the third data to the second position.

Further, preferably, the determination unit further determines whether the other portion of the second data is left, not overwritten with the first data, and if the determination unit further determines that the other portion of the second data is left, not overwritten with the first data, the positioning unit adjusts a position of the write head to the second position, and the write unit writes the third data to the second position.

Moreover, preferably, the second data is written along a plurality of tracks extending in a forward direction and a plurality of tracks extending in a reverse direction on the tape medium, the other portion of the second data written along one track is overwritten with the second data written along another track extending adjacent to the one track in the same direction as the one track, and if a moving distance of the write head from the first position to the end of the second data is shorter than a moving distance of the write head along one track in a forward direction and one track in a reverse direction on the tape medium, the determination unit determines that the other portion of the second data is left, not overwritten with the first data.

Further, preferably, the write unit writes, as the third data, pattern data that is preset as data that disables data already written to the tape medium or the write unit writes, as the third data, data generated using a portion of the first data.

Further, preferably, the write unit writes the third data over a length preset as the maximum length between positions on the tape medium at which meaningful data is to be written.

The present invention also provides an apparatus for writing data to a tape medium, including a write head for writing data to a designated position on the tape medium, a controller for controlling movement of the write head in a width direction of the tape medium, and a moving mechanism for moving the write head under control of the controller, wherein before the write head writes first data to a first position with a first width, if a portion of second data written with a second width larger than the first width is already written to the first position, the controller controls movement of the write head to a second position where the other portion of the second data is left, not overwritten with the first data, and the write head writes third data that disables the second data to the second position.

The present invention also provides an apparatus for writing data to a tape medium using a write head, including an acquiring unit for acquiring first data to be written, a determination unit for determining whether the tape medium on which the first data acquired with the acquiring unit is to be written to a first position with a first width is a particular tape medium on which a portion of second data written with a second width larger than the first width is already written to the first position, and the other portion of the second data is left at a second position, not overwritten with the first data; and a positioning unit for adjusting a position of the write head to the second position if the determination unit determines that the tape medium on which the first data is to be written is the particular tape medium; and a write unit for sending, to the write head, third data that disables the second data by a length preset as the maximum length between positions on the tape medium where meaningful data is to be written during movement of the tape medium to write the third data over the preset length from the second position.

The present invention also provides a method for writing data to a tape medium using a write head, including acquiring first data to be written, moving, if a portion of second data written with a second width larger than a first width is already written to a first position on the tape medium at which the first data is to be written with the first width, the write head to a second position where the other portion of the second data is left, not overwritten with the first data, adjusting a position of the write head to the second position if the determination unit determines that the tape medium on which the first data is to be written is the particular tape medium, sending, to the write head, third data that disables the second data to write the third data to the second position, moving the write head to the first position, and sending the first data to the write head to write the first data to the first position.

Further, the present invention also provides a program product that prompts a computer to function as an apparatus for writing data to a tape medium using a write head, the program product causing the computer to execute the functions of an acquiring unit for acquiring data to be written, a positioning unit for adjusting a position of the write head to a designated position on the tape medium, and a write unit for sending the data acquired with the acquiring unit to the write head to write the data to the designated position, wherein before the write unit writes first data acquired with the acquiring unit to a first position with a first width, if a portion of second data written with a second width larger than the first width is already written to the first position, the positioning unit adjusts a position of the write head to a second position where the other portion of the second data is left, not overwritten with the first data, and the write unit sends third data that disables the second data toward the write head to write the third data to the second position.

According to the present invention, it is possible to prevent such a defect that old data is not completely overwritten with new data and the new data cannot be properly read.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which:

FIGS. 3(a) and 3(b) show a relationship between a track pitch and a generation of a format of a tape used in the embodiment of the present invention and a relationship between a generation of a tape drive, and widths of a write head and a read head in the embodiment of the present invention.

FIG. 9 is a flowchart of an operational example of a tape drive in the embodiment of the present invention.

DETAILED DESCRIPTION OF THE DRAWINGS

Hereinafter, best modes for carrying out the invention (hereinbelow referred to as "embodiments") will be described in detail with reference to the accompanying drawings.

Figure 1:
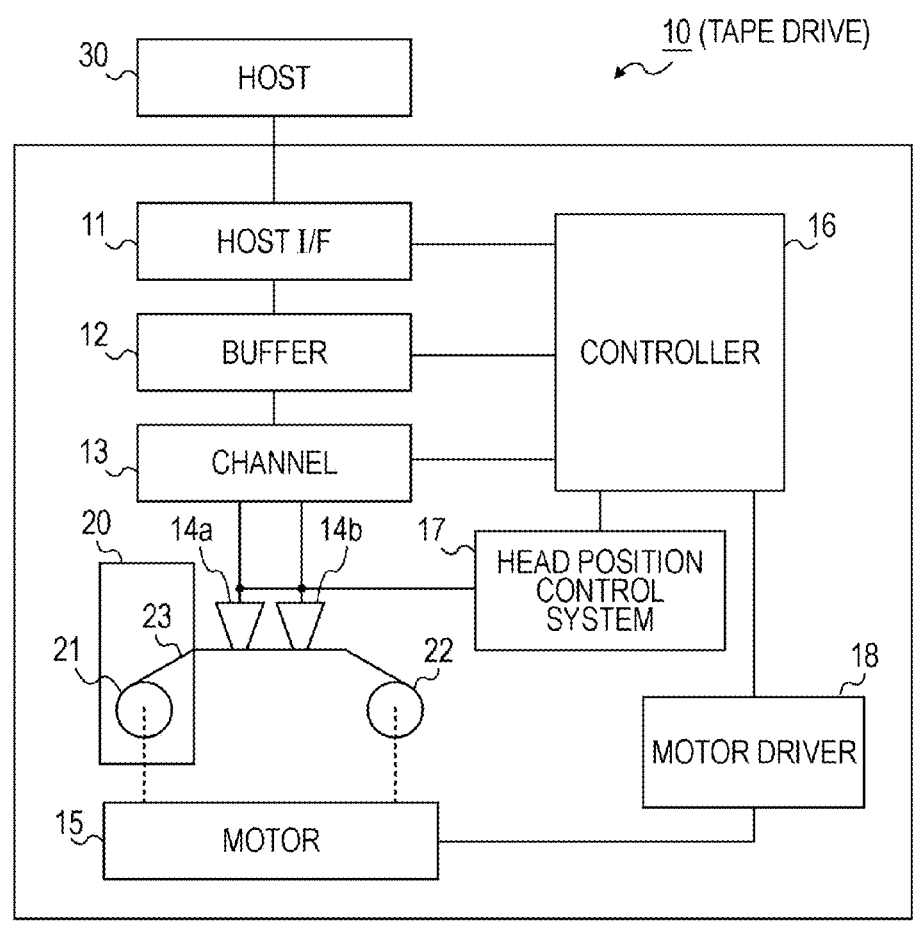
FIG. 1 is a block diagram showing a configuration example of a tape drive according to an embodiment of the present invention.

FIG. 1 shows a tape drive 10 according to an embodiment of the present invention. The tape drive 10 includes a host interface (hereinafter referred to as "host I/F") 11, a buffer 12, a channel 13, a write head 14a, a read head 14b, and a motor 15. Further, the tape drive 10 includes a controller 16, a head position control system 17, and a motor driver 18. Further, a tape cartridge 20 is insertable and thus illustrated in FIG. 1. The tape cartridge 20 includes a tape 23 wound around reels 21 and 22. The tape 23 is unreeled along with the rotations of the reels 21 and 22 in a longitudinal direction from the reel 21 to the reel 22 or from the reel 22 to the reel 21. The magnetic tape is cited as an example of the tape 23, but any tape medium other than the magnetic tape can be used.

The host I/F 11 communicates with a host 30 that typifies an upper device. For example, the host I/F 11 receives a command to write data to the tape 23, a command to run out the tape 23 up to a target position, and a command to read data from the tape 23 from the host 30. Here, the host I/F 11 conforms to the communication standard, SCSI, by way of example. As for the SISI, the first command corresponds to Write command, the second command corresponds to Locate command or Space command, and the third command corresponds to Read command. Further, the host I/F 11 sends a response indicating whether processing of each command is successfully executed, back to the host 30.

The buffer 12 is a memory storing data to be written to the tape 23 or data read from the tape 23. For example, the buffer is configured using a DRAM (dynamic random access memory). Further, the buffer 12 includes plural buffer segments each storing a data set that is the minimum amount of data written/read to/from the tape 23.

The channel 13 is a communication path used for transmitting data to be written to the tape 23 toward the write head 14a or receiving data read from the tape 23 from the read head 14b.

The write head 14a writes information to the tape 23 along with the longitudinal movement of the tape 23, and the read head 14b reads information from the tape 23 along with the longitudinal movement of the tape 23.

The motor 15 rotates the reels 21 and 22. Here, the motor 15 is indicated by one block in FIG. 1. However, it is preferred to provide each of the reels 21 and 22 with the motor 15, that is, to prepare two motors in total.

On the other hand, the controller 16 executes control over the tape drive 10. For example, the controller 16 controls an operation of writing data to the tape 23 or an operation of reading data from the tape 23 in accordance with a command accepted by the host I/F 11. Further, the controller 16 controls the head position control system 17 or the motor driver 18.

The head position control system 17 controls the write head 14a and the read head 14b to track desired one or more laps. The term lap means a group of plural tracks on the tape 23. If it is necessary to switch between laps, the write head 14a and the read head 14b also need to be electrically switched. Thus, the head position control system 17 controls such a switching operation. In this embodiment, the head position control system 17 is provided as an example of a moving mechanism for moving the write head.

The motor driver 18 drives the motor 15. As described above, if the two motors 15 are used, two motor drivers 18 are provided as well.

This embodiment will be described in detail hereinbelow based on an LTO® (linear tape-open)-compliant tape drive or IBM Enterprise tape drive TS1120 by way of examples (LTO® is a registered trademark of Hewlett-Packard Company, IBM Corporation, and Quantum Corporation in the United States).

To begin with, a format of the tape 23 is described as a precondition of this embodiment.

Figure 2:
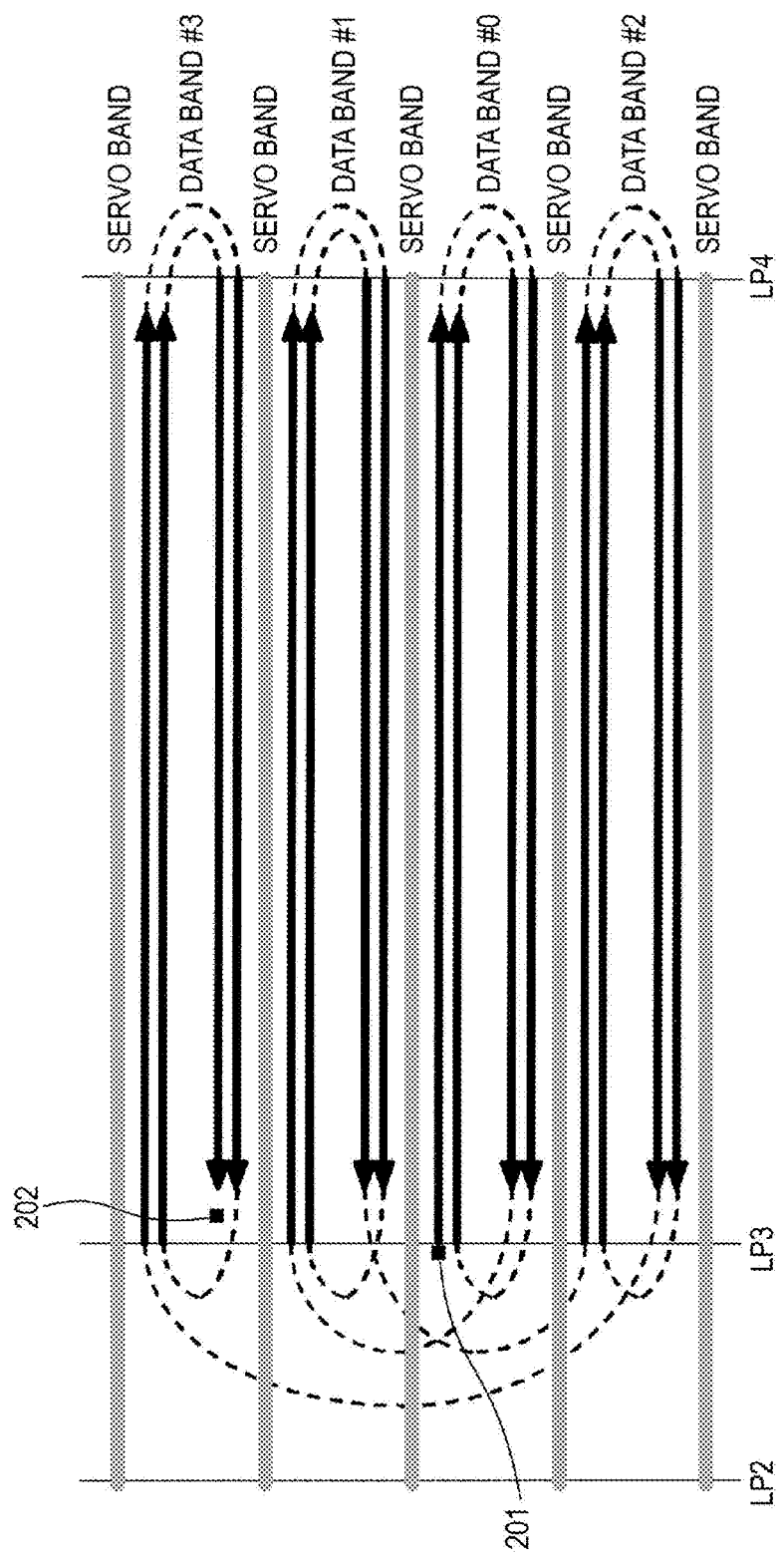
FIG. 2 schematically shows a format of a tape used in the embodiment of the present invention.

FIG. 2 schematically shows the format of the tape 23. In FIG. 2, an area from an LP2 to an LP3 is a calibration area, and an area from an LP3 to an LP4 is a user data area.

As shown in FIG. 2, five servo bands are set on the tape 23. Each servo band is an area where a servo pattern indicating a physical position on the tape 23 is written at the time of manufacture of the tape 23.

Further, the tape 23 is divided into four data bands by the five servo bands. Each data band is an area where user data is written. Each data band has more than ten elongated data areas each called "lap". In FIG. 2, one solid arrow corresponds to one lap. Data is read/written in the forward direction of each lap as indicated by the right arrow and then read/written in the reverse direction of each lap as indicated by the left arrow connected with the right arrow by the broken line. In FIG. 2, for ease of illustration, the numbers of laps where data is read/written in the forward direction and laps where data is read/written in the reverse direction are 2. However, in practice, the numbers of laps where data is read/written in the forward direction and laps where data is read/written in the reverse direction are 7 to 9, and the laps are arranged in a spiral form in one data band. In other words, data is repeatedly read/written in the forward direction and the reverse direction and thus is read/written back and forth on the tape 23 many times.

Further, on the tape 23 having such a format, an operation of reading/writing data is performed along laps arranged in a spiral form in a data band #0, starting from a start position 201. After that, the operation is shifted to data bands #1, #2, and #3 in this order, and data is read/written along laps arranged in a spiral form in each data band. This operation continues up to an end position 202. More specifically, it takes about five seconds to shift to the next data band. According to this format, in principle, only after the completion of reading/writing data from/to all laps of a current data band, data is read/written from/to the next data band.

FIG. 2 is a conceptual view not intended to show a relationship with the write head 14a or the read head 14b. The tape drive 10 generally includes the plural write heads 14a and the plural read heads 14b. For example, assuming that the solid arrows of FIG. 2 indicate paths taken by the write head 14a and the read head 14b upon writing/reading data, each solid arrow corresponds to a track. To describe an example of the tape format, if the right arrow indicates a track extending in the forward direction for the first write head 14a and read head 14b, tracks extending in the forward direction for the second, third, and subsequent write heads 14a and read heads 14b are positioned in this order below the first track. To describe another example of the tape format, if the left arrow indicates a track extending in the reverse direction for the first write head 14a and read head 14b, tracks extending in the reverse direction for the second, third, and subsequent write heads 14a and read heads 14b are positioned in this order below the first track.

The vertical length of written data in FIG. 2 is hereinafter referred to as "track pitch".

The track pitch varies depending on the generation of the format.

FIG. 3(a) shows a relationship between the track pitch and the generation of the LTO-compliant format.

In FIG. 3(a), "LTO1" represents the first-generation LTO-compliant format, "LTO2" represents the second-generation LTO-compliant format, "LTO3" represents the third-generation LTO-compliant format, and "LTO4" represents the fourth-generation LTO-compliant format.

In general, as will be also understood from FIG. 3(a), a track pitch tends to be shorter in the format of newer generation in order to increase a recording density.

Further, the tape drive 10 supports formats of several generations.

For example, the third-generation LTO tape drive can write data of the second-generation LTO-compliant format and data of the third-generation LTO-compliant format.

The fourth-generation LTO tape drive can write data of the third-generation LTO-compliant format and data of the fourth-generation LTO-compliant format.

As described above, since the tape drive 10 supports plural formats, the widths of the write head 14a and read head 14b are determined in consideration of an operation of reading/writing data of plural formats.

FIG. 3(b) shows a relationship between the generation of the tape drive 10, and the widths of the write head 14a and read head 14b. In FIG. 3(b), "LTO3" represents the third-generation LTO-compliant format, and "LTO4" represents the fourth-generation LTO-compliant format.

As also illustrated in FIG. 3(b), the width of the write head 14a is determined in accordance with the longest track pitch in the plural formats supported by the tape drive 10. In contrast, the width of the read head 14b is determined in accordance with the shortest track pitch in the plural formats supported by the tape drive 10.

As apparent from FIG. 3(b), the width of the read head 14b is about ½ of the track pitch of the format supported by the tape drive 10. The reason why the width of the read head 14b is set short is to read data within a range of a track pitch even if information about a servo band cannot be obtained at the time of reading data, and the read head 14b is slightly displaced from the right position.

Here, in the case where the third-generation LTO tape drive writes data based on the third-generation LTO-compliant format, the width (19.5 μm) of the write head 14a is large than the track pitch (14.3 μm) and thus, the written data extends off the track.

To prevent such a drawback, in the case of writing data in the forward direction (from the LP3 to the LP4 in FIG. 2), the upper end of the track and the upper end of the write head 14a are aligned with each other. On the other hand, in the case of writing data in the reverse direction (from the LP4 to the LP3 in FIG. 2), the lower end of the track and the lower end of the write head 14a are aligned with each other. In this way, the extended data portion is overwritten at the time of writing data to an adjacent track to thereby realize the track pitch shorter than the width of the write head 14a.

Figure 4:
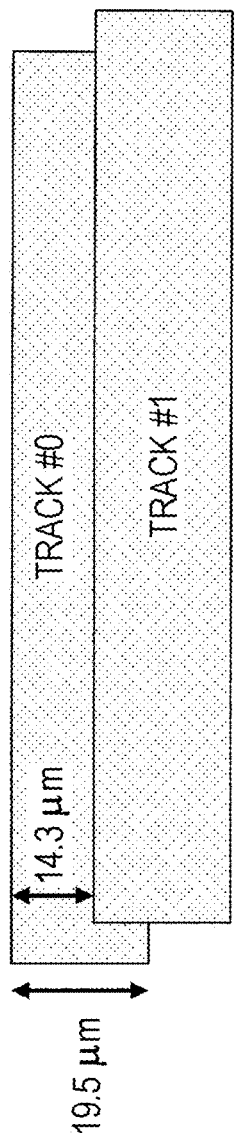
FIG. 4 illustrates how a write head that supports a format of old generation writes data based on a format of new generation in the embodiment of the present invention.

FIG. 4 shows such a writing method. In FIG. 4, it is assumed that data is written in the forward direction on tracks #0 and #1.

As shown in FIG. 4, first, the write head 14a of the third-generation LTO tape drive writes data onto the track #0 with a track width of 19.5 μm. After that, however, data on the lower end of the track #0 is overwritten with data on the track #1. At this time, the track pitch is 14.3 μm, which is a track pitch defined by the third-generation LTO-compliant format. Here, since the same information is recorded on the tape 23 in the width direction, such an overwriting operation does not influence a data reading operation.

However, the width of the write head 14a varies depending on the tape drive. Thus, if the fourth-generation LTO tape drive overwrites data written by the third-generation LTO tape drive, for example, the old data written by the third-generation LTO tape drive might be partially left.

Figure 5:
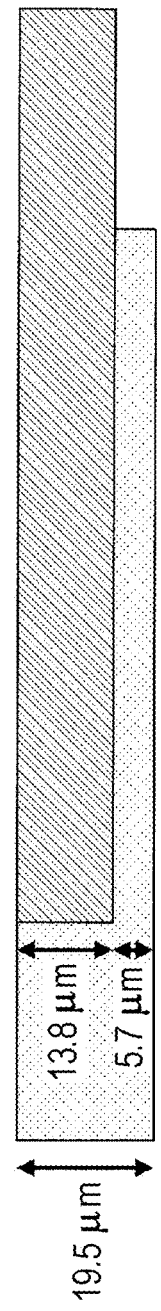
FIG. 5 illustrates how a portion of old data is left, not overwritten with new data in the embodiment of the present invention.

FIG. 5 shows how the old data is left as above. In the illustrated example, the old data already written to the tape 23 (hereinafter referred to as "old data") is hashed, and new data written onto the old data (hereinafter referred to as "new data") is hatched. In this case, the old data is data written with the third-generation LTO tape drive, and the new data is data written with the fourth-generation LTO tape drive. As for each track in FIG. 5, data is written in the forward direction.

In FIG. 5, first, the third-generation LTO tape drive writes data to a track with a track pitch of 19.5 μm. After that, the written data is overwritten with data written by the fourth-generation LTO tape drive to the next track with a track pitch of 13.8 μm. As a result, data on the track written by the third-generation LTO tape drive is partially left, not overwritten.

Then, if the data is written in this way, the width of an area that is not overwritten but left is larger than the width of the read head 14b. Accordingly, at the time of reading data, there is a possibility of erroneously reading data from the 5.7 μm-wide area that is left, not overwritten by the fourth-generation LTO tape drive. In this case, the old data not overwritten is transferred to the host 30, resulting in a problem of DI (data integrity).

To avoid such situations, in this embodiment, the tape drive 10 executes an operation for preventing this problem. To be specific, if the host 30 sends an overwrite request, just prior to execution of the overwriting operation, the write head 14a is held offset toward the lower edge of a track in FIG. 2 in the case of overwriting data in the forward direction and otherwise, toward the upper edge of a track in FIG. 2 in the case of overwriting data in the reverse direction.

First, the functional configuration of the controller 16 performing such an operation is described.

Figure 6:
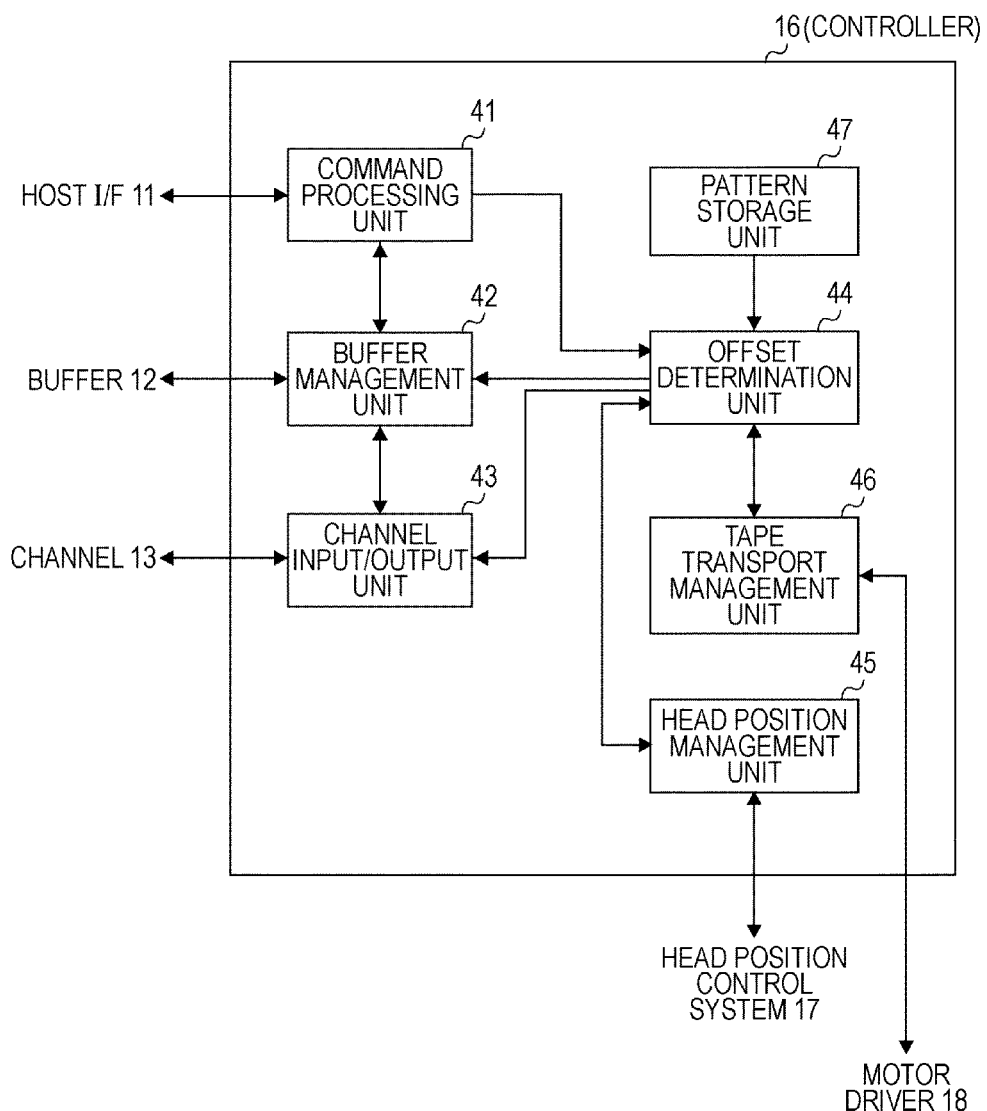
FIG. 6 is a block diagram showing a functional configuration example of a controller in the embodiment of the present invention.

FIG. 6 is a block diagram showing a functional configuration example of the controller 16.

As shown in FIG. 6, the controller 16 includes a command processing unit 41, a buffer management unit 42, a channel input/output unit 43, an offset determination unit 44, a head position management unit 45, a tape transport management unit 46, and a pattern storage unit 47.

Among the above units, the command processing unit 41 receives commands from the host I/F 11. Here, examples of the commands include a Write command to store data in the buffer 12, a synchronization command to write data stored in the buffer 12 onto the tape 23, and a Read command to read data from the tape 23. In this embodiment, the command processing unit 41 is provided as an example of an acquiring unit for acquiring data to be written.

If the command processing unit 41 receives the Write command, the buffer management unit 42 prepares data in the buffer 12. Further, if the command processing unit 41 receives the synchronization command, the buffer management unit 42 reads data from the buffer 12 and outputs the read data to the channel input/output unit 43. Further, if the command processing unit 41 receives the Read command, when target data is not found in the buffer 12, the buffer management unit 42 instructs the channel input/output unit 43 to read the data, and when target data is found in the buffer 12, the buffer management unit 42 sends the data back to the host 30 through the command processing unit 41.

The channel input/output unit 43 sends data read from the buffer 12 with the buffer management unit 42 toward the channel 13 or sends data received from the channel 13 to the buffer management unit 42. In this embodiment, the channel input/output unit 43 is provided as an example of a write unit for outputting data to a write head to thereby write the data to a designated position.

The offset determination unit 44 saves information including a position of EOD (end of data) regarding old data and a write position of new data received from the head position management unit 45 and the tape transport management unit 46 in a memory (not shown). Then, the offset determination unit 44 determines whether to execute an operation of overwriting the old data with the new data (hereinafter referred to as "offset overwriting operation") with the write head 14a being held offset at the time of overwriting the old data, based on these information. In this embodiment, the new data is used as an example of first data to be written, and the old data is used as an example of second data already written to a first position where the first data is to be written. Further, the offset determination unit 44 is provided as an example of a determination unit for determining whether a portion of the second data is already written to the first position and whether the other portion of the second data is left in a second position, not overwritten with the first data.

The head position management unit 45 outputs to the head position control system 17, a signal that makes the write head 14a and the read head 14b offset in a width direction with respect to the tape 23. Further, the head position management unit 45 obtains information about current positions of the write head 14a and the read head 14b on the tape 23 in the width direction. In this embodiment, the head position management unit 45 is provided as an example of a positioning unit for adjusting the write head to the second position.

The tape transport management unit 46 sends a signal for running the tape 23 in the forward direction or a signal for running the tape 23 in the reverse direction ("back hitch" signal) to the motor driver 18. Further, the tape transport management unit 46 obtains information about current positions of the write head 14a and read head 14b on the tape 23 in the longitudinal direction.

The pattern storage unit 47 stores pattern data preset as data that disables the old data, for example, DSS (data set separator).

Figure 7:
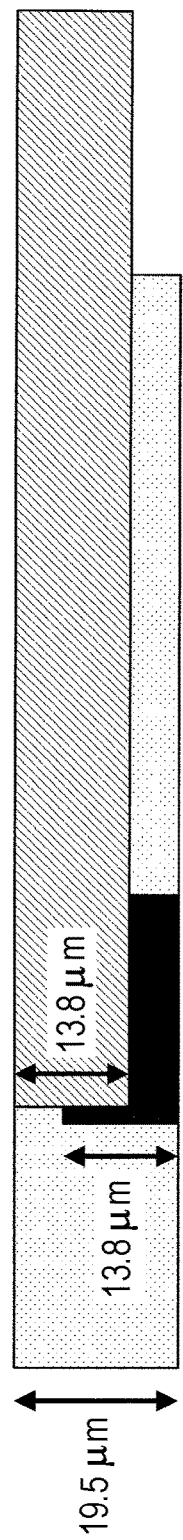
FIG. 7 schematically illustrates an offset overwriting operation in the embodiment of the present invention.

FIG. 7 shows how the tape drive 10 overwrites the old data. Also in this example, the old data is hashed, and the new data is hatched. In this case, the old data is data written by the third-generation LTO tape drive, and the new data is data written by the fourth-generation LTO tape drive. Here, it is assumed that data is written in the forward direction on each track in FIG. 7.

In FIG. 7, as in the example of FIG. 5, the third-generation LTO tape drive first writes data on a track with a track pitch of 19.5 μm. After that, the fourth-generation LTO tape drive is requested to overwrite the written data with data written on a track with a track pitch of 13.8 μm. At this time, in this embodiment, the write head 14a is made offset downwardly to fill in a black solid portion in FIG. 7 with pattern data prior to the overwriting operation.

Through such an offset overwriting operation, the old data is completely and securely rewritten. Accordingly, even if the read head 14b is positioned in an elongated area that was left, not overwritten at the time of reading data, the problem of DI never occurs.

Further, the portion rewritten through the offset overwriting operation is an area that would be rewritten if the third-generation LTO tape drive performs an overwriting operation. Thus, rewriting the portion causes no problem.

Next, operations of the tape drive 10 are described in detail.

As described above, the offset overwriting operation disables data if the data is already written at a write position. On the other hand, if no data is written at the write position, meaningless data is merely written and thus, no problem arises upon reading data. Therefore, the tape drive 10 can perform the offset overwriting operation just prior to an operation of writing data to the tape 23 even if no data is written to the tape 23 or data is not written to the tape 23 to cause the problem described with reference to FIG. 5.

However, in general, a write error would occur upon writing data. Therefore, considering the total performance, it is preferred not to perform the offset overwriting operation if not necessary but to perform the offset overwriting operation only if necessary.

To that end, the following description is given on the assumption that the offset overwriting operation is performed only if necessary.

Figure 8:
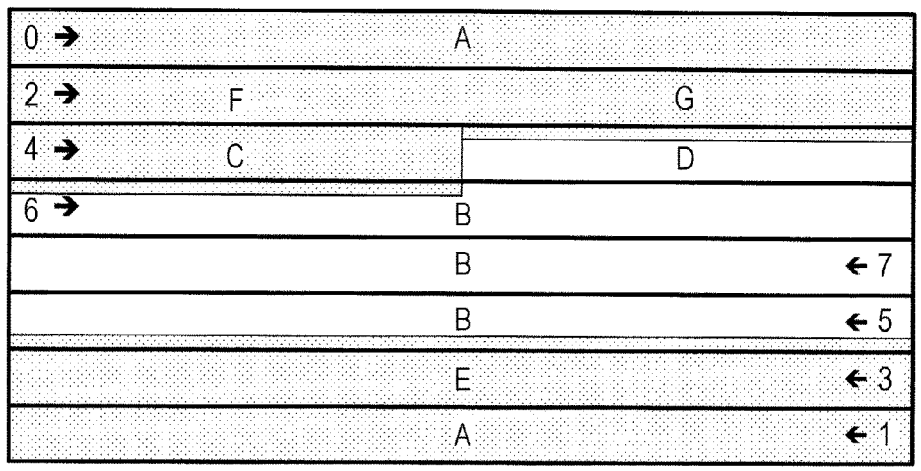
FIGS. 8(a) and 8(b) illustrate conditions for an offset overwriting operation in the embodiment of the present invention.
Figure 8:
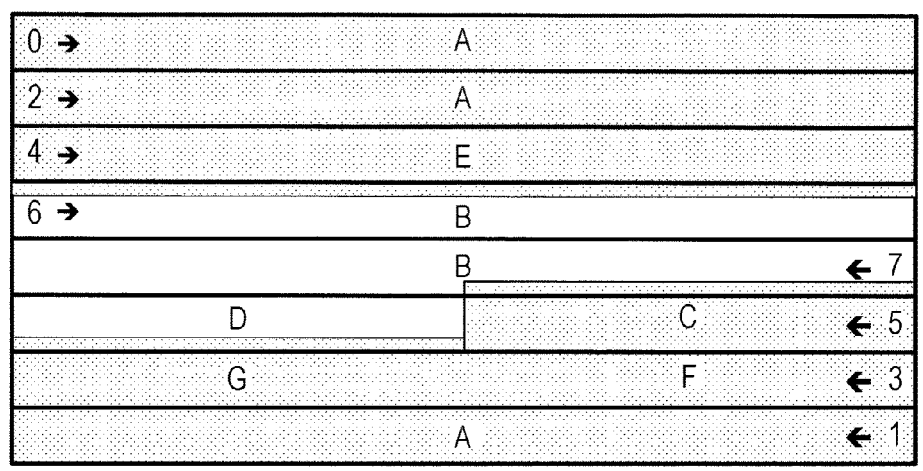

FIGS. 8(a) and 8(b) illustrate the case where the offset overwriting operation should be performed. In the illustrated example as well, the old data is hashed. In FIGS. 8(a) and 8(b), for ease of illustration, four laps extending in the forward direction and four laps extending in the reverse direction, eight laps in total, are illustrated. More specifically, as for the laps extending in the forward direction, numbers illustrated on the left side together with the arrows each indicate a lap number of a lap extending in the forward direction, and numbers illustrated on the right side together with the arrows each indicate a lap number of a lap extending in the reverse direction.

FIG. 8(a) shows the case where the old data ends in an even-numbered lap, more specifically, the EOD of the old data is in the even-numbered lap. FIG. 8(b) shows the case where the old data ends in an odd-numbered lap, more specifically, the EOD of the old data is in the odd-numbered lap.

In either of the cases in FIGS. 8(a) and 8(b), at the time of writing new data from any position in areas A and F, old data extending up to an adjacent lap is already overwritten with old data in the adjacent lap, and thus, new data is written thereto as general without executing the offset overwriting operation. Further, at the time of writing new data from any position in areas G, E, and C, old data extending up to an adjacent lap is left, not overwritten, and thus, new data should be written thereto after the offset overwriting operation. Further, as for a request to write new data from any position in areas D and B, the host 30 receives an error message to the effect that such a writing operation is not allowed unless the EOD of the old data is erased.

The offset overwriting operation executed under such conditions is specifically described below.

FIG. 9 is a flowchart of an operational example of the tape drive 10 during the offset overwriting operation.

In the tape drive 10, the command processing unit 41 first accepts a request to write new data and sends the request to the offset determination unit 44 (step S101).

Then, the offset determination unit 44 determines whether old data written with a tape drive of the old-generation format is left on the tape 23 (step S102). The determination can be made based on information about the old data that is stored in a CM (cartridge memory) in advance.

If the determination result shows that the old data is not left on the tape 23, new data is written to the tape 23 as usual (step S115). In other words, if the offset determination unit 44 notifies the buffer management unit 42 that new data can be written as usual, the buffer management unit 42 retrieves a data set from the buffer 12 and transfers the data set to the channel input/output unit 43, and the channel input/output unit 43 writes the data set to the tape 23 by means of the write head 14a.

At this time, the information about the old data includes a number of a lap including the EOD of old data and an LPOS (physical longitudinal position on the tape 23), and the offset determination unit 44 saves such information. Further, the offset determination unit 44 obtains a number of a lap where the write head 14a is being positioned from the head position management unit 45 and obtains an LPOS of a current position of the write head 14a from the tape transport management unit 46 to save these information as well.

The following description is made on the assumption that M represents a number of a lap including the EOD of old data, N represents a number of a lap where new data is to be written, P represents an LPOS of the EOD of old data, and Q represents an LPOS of a position from which an operation of writing new data starts. Here, the LPOS increases its value toward the right end in FIGS. 8(a) and 8(b).

After that, the offset determination unit 44 determines whether N is smaller than (M−2) (step S103). If N is smaller than (M−2), new data is written to the tape 23 as usual (step S115). To elaborate, the offset determination unit 44 notifies the buffer management unit 42 that new data can be written as usual, the buffer management unit 42 retrieves a data set from the buffer 12 and transfers the data set to the channel input/output unit 43, and the channel input/output unit 43 writes the data set to the tape 23 by means of the write head 14a. The above corresponds to the case of starting the writing operation with the area A in FIGS. 8(a) and 8(b).

If N is not smaller than (M−2), the offset determination unit 44 determines whether N is larger than M (step S104). If N is larger than M, an error message is sent to the host 30 (step S116). To be specific, if the offset determination unit 44 notifies the command processing unit 41 that data cannot be written, the command processing unit 41 informs the host 30 of an error. The above corresponds to the case of starting the writing operation with the area B in FIGS. 8(a) and 8(b).

If N is not larger than M, N is M, M−1, or M−2. Thus, the offset determination unit 44 determines which of M, M−1, and M−2 equals N (step S105).

Firstly, consider that N is M.

In this case, the offset determination unit 44 determines whether M is an even number (step S106).

As a result, if M is an even number, the offset determination unit 44 first determines whether P<Q (step S107). If the condition of P<Q is not satisfied, the processing shifts to the offset overwriting operation. The above corresponds to the case of starting the writing operation with the area C in FIG. 8(a). If the condition of P<Q is satisfied, an error message is sent to the host 30 (step S116). The above corresponds to the case of starting the writing operation with the area D in FIG. 8(a).

On the other hand, also in the case where M is an odd number, the offset determination unit 44 first determines whether P<Q (step S108). If the condition of P<Q is satisfied, the processing shifts to the offset overwriting operation. The above corresponds to the case of starting the writing operation with the area C in FIG. 8(b). If the condition of P<Q is not satisfied, an error message is sent to the host 30 (step S116). The above corresponds to the case of starting the writing operation with the area D in FIG. 8(b).

Secondly, consider that N is (M−1).

In this case, the offset determination unit 44 directly starts the offset overwriting operation. The above corresponds to the case of starting the writing operation with the area E in FIGS. 8(a) and 8(b).

Finally, consider that N is (M−2).

In this case, the offset determination unit 44 determines whether M is an even number (step S109).

As a result, if M is an even number, the offset determination unit 44 first determines whether P<Q (step S110). If the condition of P<Q is satisfied, the processing shifts to the offset overwriting operation. The above corresponds to the case of starting the writing operation with the area G in FIG. 8(a). If the condition of P<Q is not satisfied, new data is written to the tape 23 without executing the offset overwriting operation (step S115). The above corresponds to the case of starting the writing operation with the area F in FIG. 8(a).

On the other hand, also in the case where M is an odd number, the offset determination unit 44 first determines whether P<Q (step S111). If the condition of P<Q is not satisfied, the processing shifts to the offset overwriting operation. The above corresponds to the case of starting the writing operation with the area G in FIG. 8(b). If the condition of P<Q is satisfied, new data is written to the tape 23 without executing the offset overwriting operation (step S115). The above corresponds to the case of starting the writing operation with the area F in FIG. 8(b).

Hereafter, the offset overwriting operation is described.

First, the offset determination unit 44 holds the write head 14a offset (step S112). To be specific, the offset determination unit 44 instructs the head position management unit 45 to output a signal for making the write head 14a offset to the head position control system 17. At this time, the head position management unit 45 outputs a signal for making the write head 14a offset downwardly in FIGS. 8(a) and 8(b) if a current lap is an even-numbered one, and outputs a signal for making the write head 14a offset upwardly in FIGS. 8(a) and 8(b) if a current lap is an odd-numbered one.

Next, the offset determination unit 44 overwrites old data with pattern data that disables the old data (step S113). More specifically, the offset determination unit 44 reads pattern data from the pattern storage unit 47 and sends the data to the channel input/output unit 43. Then, the channel input/output unit 43 sends the pattern data to the write head 14a to thereby overwrite the old data with the pattern data.

After that, the offset determination unit 44 puts the write head 14a back into a write position of new data (step S114). To be specific, the offset determination unit 44 instructs the tape transport management unit 46 to output toward the motor driver 18, a backhitch signal for rewinding the tape 23 until the position of the write head 14a in the longitudinal direction matches the write position of the new data. Further, the offset determination unit 44 instructs the head position management unit 45 to output a signal for cancelling an offset state of the write head 14a toward the head position control system 17.

Finally, new data is written to the tape 23 as usual (step S115). In other words, when the offset determination unit 44 notifies the buffer management unit 42 that data can be written as usual, the buffer management unit 42 reads a data set from the buffer 12 and transfers the data set to the channel input/output unit 43, and the channel input/output unit 43 writes the data set to the tape 23 by means of the write head 14a.

Through the above processing, the operation of the tape drive 10 is completed.

In the above examples, the offset overwriting operation is performed using preset pattern data that disables old data. However, the present invention is not limited thereto. For example, the offset overwriting operation may be performed using data generated from new data such as data generated by repeatedly arraying the top data set of new data. In this embodiment, disabling data such as data generated using a part of new data or pattern data is used as an example of third data that disables second data.

Further, in either case, it is preferred to write such disabling data over at least 4 m. The specifications of the LTO or IBM Enterprise tape drive TS1120 define an interval between two data sets as 4 m or less. Accordingly, if the length of written disabling data is less than 4 m, when the read head 14b is positioned in an elongated area that is left, not overwritten, the read head reads consecutive data sets. As a result, the necessity of adjusting a position of the read head 14b could not be recognized.

Further, in the above description, as illustrated in FIGS. 8(a) and 8(b), in the case where a moving distance of the write head 14a from a position at which new data is to be written to the EOD of old data is shorter than a moving distance of the write head 14a along one track extending in the forward direction and one track extending in the reverse direction on the tape medium, the determination unit determines that the old data is partially left, not overwritten with the new data. However, it is possible to determine that the old data is partially left, not overwritten with the new data, based on any other method. For example, in practice, as in written data extending from laps #0 and #1 in FIG. 8(a) or laps #0 to #2 in FIG. 8(b) up to an adjacent lap, data supposed to be overwritten with data in an adjacent lap is not overwritten. For example, the following case is conceivable: a write error or the like occurs in an adjacent lap, and no data is written over a predetermined length. In this case, information about an area where the error occurred and old data was not overwritten is stored, and whether to execute the offset overwriting operation might be determined based on the information.

As described above, in this embodiment, if some portion of old data is not overwritten with new data, prior to an operation of writing the new data, the write head 14a is made offset and the old data is overwritten with disabling data. As a result, even in the case where the read head 14b is positioned in the portion of the old data not overwritten with the new data upon reading the data, if the read head tries to read the data for a while, it can be recognized that the read head is positioned in the portion of the old data not overwritten with the new data. As a result, the position of the read head 14b is returned to a start position of the new data and then adjusted to read the data again, for example. Therefore, it rarely happens that the old data is erroneously sent to the host 30.

The present invention may be accomplished using either hardware components or software components or both hardware and software components. Further, the present invention can be embodied as a computer, a data processing system, or a computer program product. This computer program product may be stored in a computer-readable medium and provided. Conceivable examples of the medium include an electronic, magnetic, optical, electromagnetic, infrared, or semiconductor system (device or apparatus) and a propagating medium. Examples of the computer-readable medium include a semiconductor storage device, a solid-state storage device, a magnetic tape, a removable computer diskette, a random access memory (RAM), a read only memory (ROM), a rigid magnetic disk, and an optical disk. Examples of existing optical disks include a compact disk read only memory (CD-ROM), a compact disk read/write (CD-R/W), and a DVD.

The present invention is described above based on the embodiments, but a technical scope of the present invention is not limited to the above embodiments. Those skilled in the art could easily understand that various modifications and alternatives can be made without departing from the spirit and scope of the present invention.

The invention claimed is:

1. A method for writing data to a tape medium using a write head, comprising:
   acquiring first data to be written;
   moving, if a portion of second data written with a second width larger than a first width is already written to a first position on the tape medium at which the first data is to be written with the first width, the write head to a second position where the other portion of the second data is left, not overwritten with the first data;
   adjusting a position of the write head to the second position if a determination unit determines that the tape medium on which the first data is to be written is the particular tape medium;
   sending, to the write head, third data that disables the second data to write the third data to the second position;
   moving the write head to the first position; and
   sending the first data to the write head to write the first data to the first position.

2. The method of claim 1, wherein:
   the second data is written along a plurality of tracks extending in a forward direction and a plurality of tracks extending in a reverse direction on the tape medium,
   the other portion of the second data written along one track is overwritten with the second data written along another track extending adjacent to the one track in the same direction as the one track, and
   if a moving distance of the write head from the first position to the end of the second data is shorter than a moving distance of the write head along one track in a forward direction and one track in a reverse direction on the tape medium, the determination unit determines that the other portion of the second data is left, not overwritten with the first data.

3. The method of claim 1, further comprising writing as the third data, pattern data that is preset as data that disables data already written to the tape medium.

4. The method of claim 1, further comprising writing as the third data, data generated using a portion of the first data.

5. The method of claim 1, further comprising writing the third data over a length preset as the maximum length between positions on the tape medium at which meaningful data is to be written.

* * * * *